US007016972B2

(12) United States Patent
Bertram et al.

(10) Patent No.: US 7,016,972 B2
(45) Date of Patent: Mar. 21, 2006

(54) METHOD AND SYSTEM FOR PROVIDING AND VIEWING PERFORMANCE ANALYSIS OF RESOURCE GROUPS

(75) Inventors: Randal Lee Bertram, Raleigh, NC (US); Antonio Abbondanzio, Raleigh, NC (US); Janet Anne Brewer, Pittsboro, NC (US); James Franklin Macon, Jr., Apex, NC (US); Gregory Joseph McKnight, Chapel Hill, NC (US); Walter Cade Metz, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 09/840,400

(22) Filed: Apr. 23, 2001

(65) Prior Publication Data

US 2002/0156884 A1    Oct. 24, 2002

(51) Int. Cl.
 *G06F 15/173* (2006.01)
 *G06F 15/16* (2006.01)
(52) U.S. Cl. ...................... 709/235; 709/224
(58) Field of Classification Search ............... 709/224, 709/223, 232, 233, 234, 235; 718/104
See application file for complete search history.

(56) References Cited

U.S. PATENT DOCUMENTS

| | | | |
|---|---|---|---|
| 4,933,936 A | 6/1990 | Rasmussen et al. | |
| 5,283,897 A | 2/1994 | Georgiadis et al. | |
| 5,506,987 A | 4/1996 | Abramson et al. | |
| 5,668,995 A * | 9/1997 | Bhat | 718/104 |
| 5,701,482 A | 12/1997 | Harrison et al. | |
| 5,768,500 A * | 6/1998 | Agrawal et al. | 714/47 |
| 5,898,870 A | 4/1999 | Okuda et al. | |
| 5,923,874 A | 7/1999 | Koenig | |
| 6,061,761 A | 5/2000 | Bachmat | |
| 6,105,053 A | 8/2000 | Kimmel et al. | |
| 6,148,335 A * | 11/2000 | Haggard et al. | 709/224 |
| 6,230,204 B1 * | 5/2001 | Fleming, III | 709/229 |
| 6,301,615 B1 * | 10/2001 | Kutcher | 709/224 |
| 6,339,750 B1 * | 1/2002 | Hoyer et al. | 702/182 |
| 6,405,327 B1 * | 6/2002 | Sipple et al. | 714/39 |
| 6,434,613 B1 * | 8/2002 | Bertram et al. | 709/223 |
| 6,505,248 B1 * | 1/2003 | Casper et al. | 709/224 |
| 6,557,035 B1 * | 4/2003 | McKnight | 709/224 |
| 6,560,647 B1 * | 5/2003 | Hafez et al. | 709/224 |
| 6,606,658 B1 * | 8/2003 | Uematsu | 709/225 |
| 6,697,969 B1 * | 2/2004 | Merriam | 714/46 |

(Continued)

OTHER PUBLICATIONS

Y. Wada et al., "Distributed algorithms for allocating resources to process groups and their complexity", 1999, Systems and computers in Japan v30, n6, pp. 23-35.

(Continued)

*Primary Examiner*—Paul H. Kang
(74) *Attorney, Agent, or Firm*—Sawyer Law Group LLP

(57) ABSTRACT

A method and system for providing performance analysis on a computer system is disclosed. The computer system includes at least one resource group and at least one node. The method and system include obtaining performance data for a plurality of monitors for the at least one resource group and analyzing the performance data to determine whether performance of the system can be improved using the at least one resource group. Preferably, performance is improved by moving the resource group between nodes. The method and system include graphically displaying the performance data graphically displaying performance data for at least one monitor of the plurality of monitors for the at least one resource group.

14 Claims, 7 Drawing Sheets

U.S. PATENT DOCUMENTS 6,763,380 B1 * 7/2004 Mayton et al. ............. 709/224
2002/0133584 A1 * 9/2002 Greuel et al. ............... 709/224

OTHER PUBLICATIONS

IBM TDB 08-86 v23 n3 p1134-1135, "Monitoring of Devices Usage".

IBM TDB 05-88 v30 n12, pp. 268-277, "Layout algorithm for computer network management graphics".

Bruno Sehabiague, "Cluster & workload Management", Oct. 1997, pp. 1-19.

M. J. freely et al., "Implementing global memory management in a workstation cluster", Proc of the fifteenth ACM Symp on Operating systems principle, 1995, p201-212.

U.S. Patent Application filed Mar. 13, 2001, Bertram et al., "Method and System for Providing Performance Analysis for Clusters", 09/805,413.

U.S. Patent Application filed Feb. 23, 199, Betram et al., U.S. Appl. No. 09/256,452, "System and Method for Monitoring and Analyzing Computer System Performance and Making Recommendations for Improving It".

U.S. Appl. No. 09/255,955, filed Feb. 23, 1999, "System and Method for Identifying Latent Computer System Bottlenecks and for Making Recommendations for Improving Computer System Performance", Bertram et al.

U.S. Appl. No. 09/255,680, "System and Method for Predicting Computer System Performance and for Making Recommendations for Improving its Performance", filed Feb. 23, 1999.

* cited by examiner

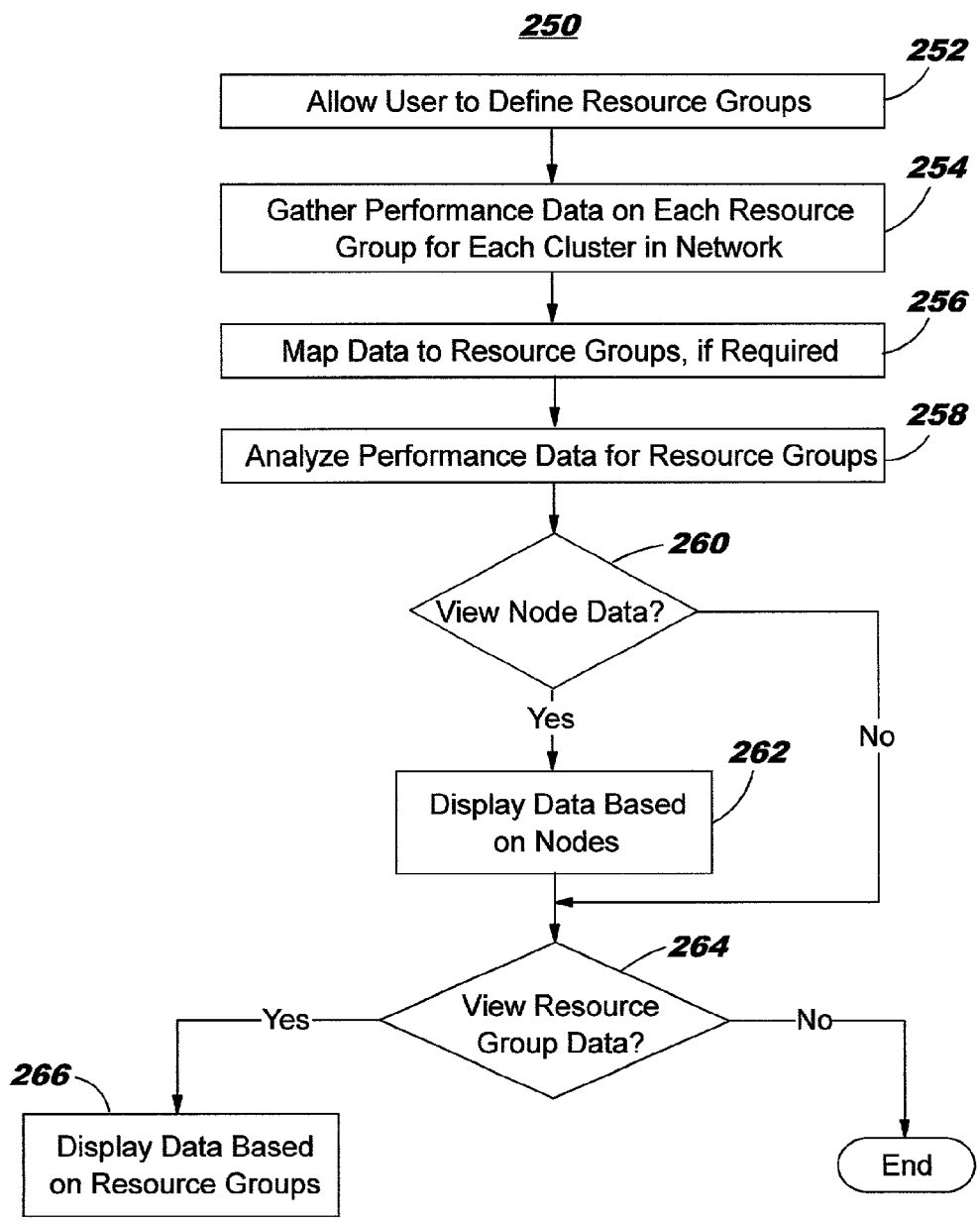

METHOD AND SYSTEM FOR PROVIDING AND VIEWING PERFORMANCE ANALYSIS OF RESOURCE GROUPS

CROSS-REFERENCE TO RELATED APPLICATIONS

The present application is related to U.S. patent application Ser. No. 09/805,413, entitled "SYSTEM AND METHOD FOR PERFORMING PERFORMANCE ANALYSIS ON CLUSTERS", Mar. 13, 2001 filed on Mar. 13, 2001, and assigned to the assignee of the present application. The present application is related to U.S. patent application Ser. No. 09/255,955, now U.S. Pat. No. 6,434,413, entitled "SYSTEM AND METHOD FOR IDENTIFYING LATENT COMPUTER SYSTEM BOTTLENECKS AND FOR MAKING RECOMMENDATIONS FOR IMPROVING COMPUTER SYSTEM PERFORMANCE", filed on Feb. 23, 2000, and assigned to the assignee of the present application. The present application is related to U.S. patent application Ser. No. 09/256,452, now abandoned, entitled "SYSTEM AND METHOD FOR MONITORING AND ANALYZING COMPUTER SYSTEM PERFORMANCE AND MAKING RECOMMENDATIONS FOR IMPROVING IT", filed on Feb. 23, 1999, and assigned to the assignee of the present application. The present application is also related to U.S. patent application Ser. No. 09/255,680, now U.S. Pat. No. 6,470,464, entitled "SYSTEM AND METHOD FOR PREDICTING COMPUTER SYSTEM PERFORMANCE AND FOR MAKING RECOMMENDATIONS FOR IMPROVING ITS PERFORMANCE", filed on Feb. 23, 1999, and assigned to the assignee of the present application.

FIELD OF THE INVENTION

The present invention relates to computer systems, and more particularly to a method and system for performing performance analysis using resource groups for computer systems.

BACKGROUND OF THE INVENTION

Clusters are increasingly used in computer networks. FIG. 1 depicts a block diagram of a conventional cluster 10. The conventional cluster 10 includes two computer systems 20 and 30, that are typically servers. Each computer system 20 and 30 is known as a node. Thus, the conventional cluster 10 includes two nodes 20 and 30. However, another cluster (not shown) could have another, higher number of nodes. Clusters such as the conventional cluster 10 are typically used for business critical applications because the conventional cluster 10 provides several advantages. The conventional cluster 10 is more reliable than a single server because the workload in the conventional cluster 10 can be distributed between the nodes 20 and 30. Thus, if one of the nodes 20 or 30 fails, the remaining node 30 or 20, respectively, may assume at least a portion of the workload of the failed node. The conventional cluster 10 also provides for greater scalability. Use of multiple servers 20 and 30 allows the workload to be evenly distributed within the nodes 20 and 30. If additional nodes (not shown) are added, the workload can be distributed between all nodes in the conventional cluster 10. Thus, the conventional cluster 10 is scalable. In addition, the conventional cluster 10 is typically cheaper than the alternative. In order to produce equivalent performance and availability as the conventional cluster 10, a large-scale computer system that is typically proprietary would be used. Such a large-scale computer system is generally expensive. Consequently, the conventional cluster 10 provides substantially the same performance as such a large-scale computer system while costing less.

FIG. 1 also depicts resource groups 22, 24 and 32 residing on the nodes 20 and 30. The resource groups 22, 24 and 32 define the components, both software and hardware, that are necessary to support one or more applications. Thus, the resource groups 22 and 24 and 32 can be considered to be virtual subsets of the nodes 20 and 30, respectively. The resource groups 22 and 24 and 32 also consume the resources of the nodes 20 and 30, respectively. Thus, the resource groups 22 and 24 and 32 use the CPUs, the memory, the disks, the public network and the interconnects for the nodes 20 and 30. For example, the types of resources could include file share, generic applications, generic services, IP addresses, network names, the physical disk, print spoolers and real time servers. A file share allows sharing of a directory on one of the disks in a configuration to give access to the directory to network clients. The file share requires a physical disk and a network name (described below). A generic application allows existing applications that are not aware of the fact they reside in a cluster 10 to operate under the control of cluster software. These existing applications can then fail over and are restarted if a problem occurs. The generic application has no mandatory resource dependencies. A generic service is defined by the user at the creation of the resource and has no resource dependencies. An IP address can be used to assign a static IP address and subnet mask to the network interface selected for the cluster 10. The IP address has no dependencies. The network name gives an identity to a resource group to allow client workstations to view the resource group as a single server. The network name has an IP address dependency. The physical disk is a physical disk (not shown) in the conventional cluster 10 and has no dependencies. A print spooler allows a common storage disk (not shown) to store print jobs that will be spooled. The print spooler requires a physical disk resource and a network name resource. A real time service maintains the date and time consistency between the nodes 20 and 30 of the conventional cluster 10. A particular resource group 22, 24 and 32 may use one or more of these resources as well as other resource. For example, a particular resource group 22 may include a particular application, physical disk subsystem, an IP address, a network name resource, a print spooler and a real time clock.

During operation of the conventional cluster 10, the resource groups 22, 24 and 32 may move between nodes 20 and 30. For example, if there is a failure in one of the nodes 20 or 30, the resource groups 22 and 24 or 32, respectively, moves to the remaining node 30 or 20, respectively. This allows the conventional cluster 10 to account for failures of one of the nodes 20 or 30. The resource groups 22, 24 and 32 may also move between the nodes 20 and 30 in order to allow the conventional cluster 10 to balance the load between the nodes 20 and 30.

Although the conventional cluster 10 provides the above-mentioned benefits, one of ordinary skill in the art will readily realize that it is desirable to monitor performance of the conventional cluster during use. Performance of the conventional cluster 10 could vary throughout its use. For example, the conventional cluster 10 may be one computer system of many in a network. One or more of the nodes 20 or 30 of the conventional cluster 10 may have its memory almost full or may be taking a long time to access its disk. Phenomena such as these result in the nodes 20 and 30 in the cluster 10 having lower than desired performance. Therefore, the performance of the entire network is adversely affected. For example, suppose there is a bottleneck in the conventional cluster 10. A bottleneck in a cluster occurs when a component of a node of the conventional cluster, such as the CPU of a node, has high enough usage to cause delays. For example, the utilization of the CPU of the node, the interconnects coupled to the node, the public network interface of the node, the memory of the node or the disk of the node could be high enough to cause a delay in the node performing some of its tasks. Because of the bottleneck, processing can be greatly slowed due to the time taken to access a node 20 or 30 of the conventional cluster 10. This bottleneck in one or more of the nodes of the conventional cluster 10 adversely affects performance of the conventional cluster 10. This bottleneck may slow performance of the network as a whole, for example because of communication routed through the conventional cluster 10. A user, such as a network administrator, would then typically manually determine the cause of the reduced performance of the network and the conventional cluster 10 and determine what action to take in response. In addition, the performance of the conventional cluster 10 may vary over relatively small time scales. For example, a bottleneck could arise in just minutes, then resolve itself or last for several hours. Thus, performance of the conventional cluster 10 could change in a relatively short time.

In addition, the resource groups 22, 24 and 32 may, as discussed above, move between the nodes 20 and 30. However, there is no conventional mechanism that allows the utilizations of hardware or other resources of the conventional cluster 10 that are associated with a particular resource group 22, 24 or 32 to be tracked. Thus, the effects of moving a resource group 22, 24 or 32 between the nodes 20 and 30 cannot be determined in advance. Thus, the performance of the conventional cluster 10 with respect to the resource groups 22, 24 or 32 cannot be analyzed.

Accordingly, what is needed is a system and method for studying and improving performance of the computer system that utilizes resource groups. The present invention addresses such a need.

SUMMARY OF THE INVENTION

The present invention provides a method and system for providing performance analysis on a computer system. The computer system includes at least one resource group and at least one node. The method and system comprise obtaining performance data for a plurality of monitors for the at least one resource group and analyzing the performance data to determine whether performance of the system can be improved using the at least one resource group. The method and system comprise graphically displaying performance data for at least one monitor of the plurality of monitors for the at least one resource group.

According to the system and method disclosed herein, the present invention provides performance analysis for a computer system that utilizes resource groups and can allow the user to view the performance data for a resource group without regard to the node on which the resource group resides. In addition, the system and method can provide remedies involving the resource group, such as moving the resource group between nodes in order to improve performance.

BRIEF DESCRIPTION OF THE DRAWINGS

FIG. 4 is a more detailed flow chart of one embodiment of a method in accordance with the present invention for providing performance analysis on resource groups.

DETAILED DESCRIPTION OF THE INVENTION

Figure 1:
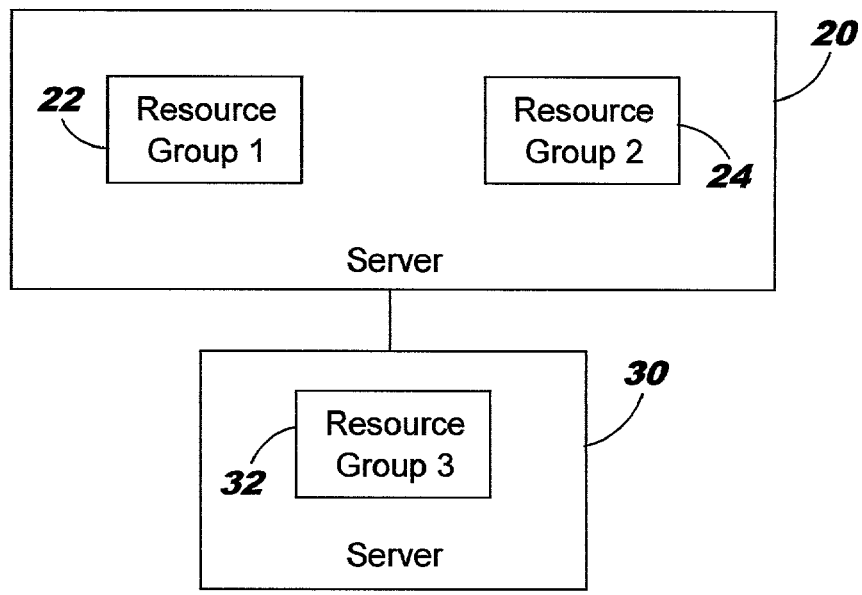
FIG. 1 is a block diagram of a conventional cluster.

The present invention relates to an improvement in analysis of performance data for computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

It is desirable to monitor the performance of computer systems within a network. One method for providing performance analysis on computer systems, typically servers, in a network is described in co-pending U.S. patent application Ser. No. 09/255,955, entitled "SYSTEM AND METHOD FOR IDENTIFYING LATENT COMPUTER SYSTEM BOTTLENECKS AND FOR MAKING RECOMMENDATIONS FOR IMPROVING COMPUTER SYSTEM PERFORMANCE", filed on Feb. 23, 2000 and assigned to the assignee of the present application. The present application is related to co-pending U.S. patent application Ser. No. 09/805,413, entitled "SYSTEM AND METHOD FOR PERFORMING PERFORMANCE ANALYSIS ON CLUSTERS", filed on Mar. 13, 2001 and assigned to the assignee of the present application. The present application is related to co-pending U.S. patent application Ser. No. 09/255,955, entitled "SYSTEM AND METHOD FOR IDENTIFYING LATENT COMPUTER SYSTEM BOTTLENECKS AND FOR MAKING RECOMMENDATIONS FOR IMPROVING COMPUTER SYSTEM PERFORMANCE", filed on Feb. 23, 2000 and assigned to the assignee of the present application. The present application is also related to co-pending U.S. patent application Ser. No. 09/256,452, entitled "SYSTEM AND METHOD FOR MONITORING AND ANALYZING COMPUTER SYSTEM PERFORMANCE AND MAKING RECOMMENDATIONS FOR IMPROVING IT", filed on Feb. 23, 1999 and assigned to the assignee of the present application. The present application is also related to co-pending U.S. patent application Ser. No. 09/255,680, entitled "SYSTEM AND METHOD FOR PREDICTING COMPUTER SYSTEM PERFORMANCE AND FOR MAKING RECOMMENDATIONS FOR IMPROVING ITS PERFORMANCE", filed on Feb. 23, 1999 and assigned to the assignee of the present application. Applicant hereby incorporates by reference the above-mentioned co-pending applications. Using the methods and systems described in the above-mentioned co-pending applications, performance data can be provided and analyzed for each computer system in a network. In addition, performance analysis can be performed on stand-alone computer systems as well as clusters. The performance data provided can indicate changes that occur in relatively short time scales. This is because performance data is sampled frequently, every minute in one embodiment. In addition, the performance data is analyzed to determine the presence of bottlenecks and latent bottlenecks in stand-alone computer systems and nodes of a cluster. A latent bottleneck is, for example, a bottleneck that will occur when another, larger bottleneck has been cleared. The methods and systems described in the above-mentioned co-pending applications also provide remedies for removing bottlenecks and latent bottlenecks. These remedies are appropriate for a network having stand-alone computer systems as well as clusters. The methods and systems described in the above-mentioned co-pending patent applications, therefore, provide performance data for stand-alone computer systems and clusters.

Clusters may utilize resource groups. Resource groups define the components, both software and hardware, that are necessary to support one or more applications. Thus, the resource groups use the CPUs, the memory, the disks, the public network interfaces, and the interconnects for the nodes in a computer system. Although the methods and systems described in the above-mentioned co-pending applications function well for their intended purpose, they do not track performance data for resource groups. For example, as described above, resource groups may move between nodes for a variety of reasons. Although the systems and methods described in the above-mentioned co-pending applications can display and analyze performance data for different nodes, the resource groups for a particular node are not isolated. In addition, the resource groups are not tracked as the resource groups move between nodes.

The present invention provides a method and system for providing performance analysis on a computer system. The computer system includes at least one resource group and at least one node. The method and system comprise obtaining performance data for a plurality of monitors for the at least one resource group and analyzing the performance data to determine whether performance of the system can be improved using the at least one resource group. In a preferred embodiment, one or more of the at least one resource group could be moved between nodes. The method and system comprise graphically displaying performance data for at least one monitor of the plurality of monitors for the at least one resource group.

The present invention will be described in terms of a particular network and certain clusters. However, one of ordinary skill in the art will readily recognize that this method and system will operate effectively for other networks and other clusters. Similarly, the present invention is described in terms of particular methods having certain steps. However, one of ordinary skill in the art will readily understand that the method and system are consistent with other methods having different or additional steps. Furthermore, although described independently, one of ordinary skill in the art will readily recognize that the method and system can be utilized with the methods and systems described in the above-mentioned co-pending applications. Moreover, the present invention is described in the context of a cluster having multiple nodes. However, one of ordinary skill in the art will readily recognize that in an alternate embodiment, the present invention might be extended to a stand-alone computer system having a single node. In addition, the present invention is described in the context of multiple resource groups. However, one of ordinary skill in the art will readily recognize that in an alternate embodiment, the present invention might be extended to single resource groups.

Figure 2:
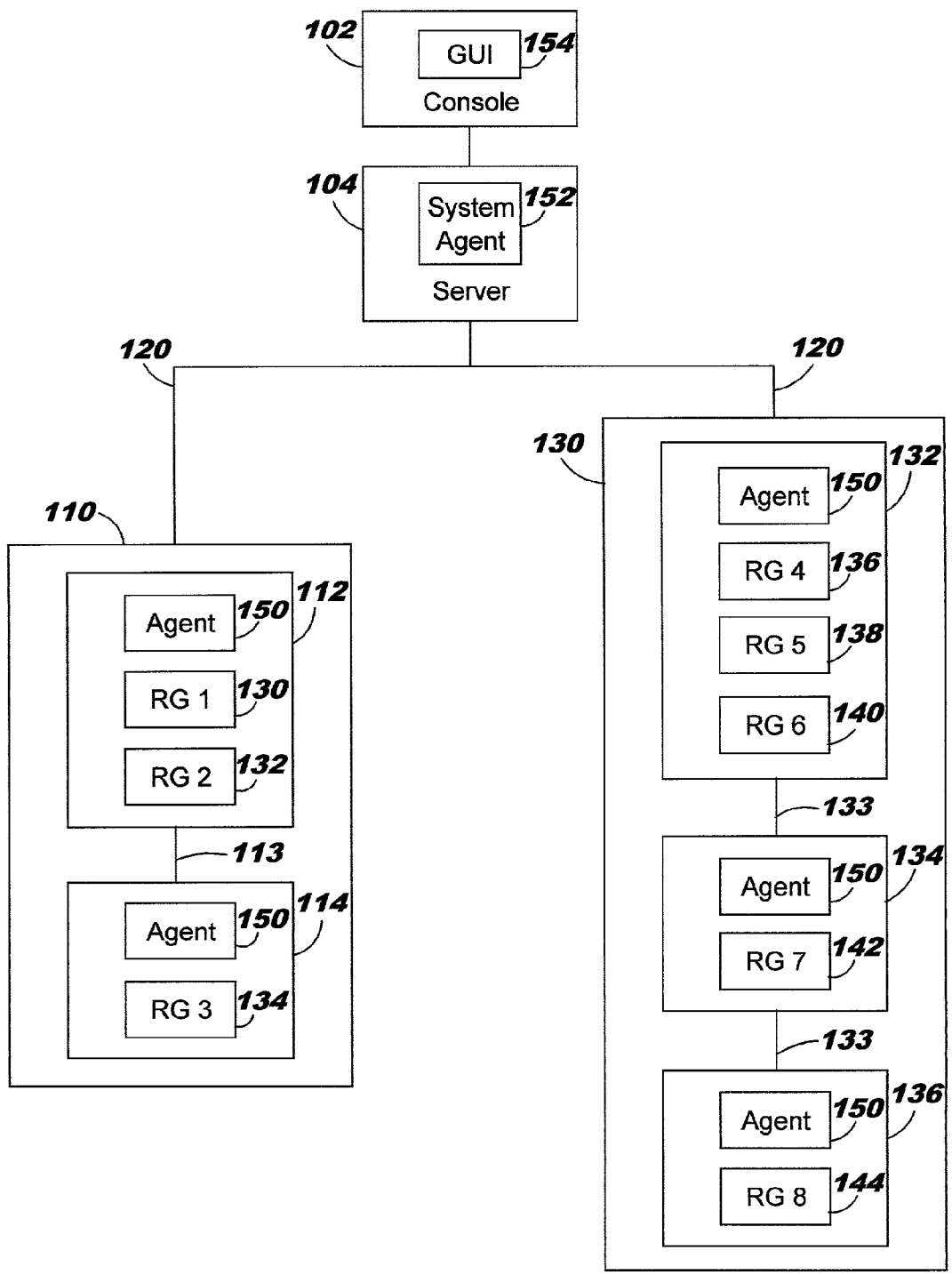
FIG. 2 is a block diagram of a network including clusters in which one embodiment of a system in accordance with the present invention operates.

To more particularly illustrate the method and system in accordance with the present invention, refer now to FIG. 2, depicting one embodiment of a network 100 in which the system and method in accordance with the present invention are utilized. The network 100 includes computer systems 104, 110, 120, 130 and 140, as well as console 102. The computer systems 110 and 130 are clusters. Thus, the cluster 110 includes two nodes 112 and 114 and the cluster 130 includes three nodes 132, 134 and 136. Each node 112, 114, 132, 134 and 136 is preferably a server. The nodes 112 and 114 are connected through interconnect 113. The nodes 132 and 134 and 134 and 136 are coupled using interconnect 133. The cluster 110 and 130 are coupled through the public LAN 120. The nodes 112 and 114 include resource groups 130 and 132 and 134, respectively. The nodes 132, 134 and 136 include resource groups 136, 138 and 140, resource group 142 and resource group 144, respectively.

The console 102 is utilized by a user, such as a system administrator, to request performance data on the network 100. Although only one console 102 is depicted, the network 100 may includes multiple consoles from which the method and system in accordance with the present invention can be implemented. The system includes preferably includes an agent 150 located in each node 112, 114, 132, 134, and 136. The nodes 112, 114, 132, 134 and 136 and the computer systems 120 and 140 are preferably servers. In addition, for clarity, portions of the nodes 112, 114, 132, 134 and 136 and the computer systems 120 and 140 are not depicted. For example, the disks, memory, and CPUs of the nodes 112, 114, 132, 134, and 136 and the computer system 120 and 140 are not shown. The agents 150 are utilized to obtain performance data about each of the computer systems 110, 120, 130 and 140, including performance data about each of the nodes 112, 114, 132, 134 and 136. The server 104 includes a system agent 152. Upon receiving a request from the console 102, the system agent 150 requests reports on performance data from the agents 150, compiles the performance data from the agents 150 and can store the performance data on the memory for the server 104. The performance data is provided to the user via a graphical user interface ("GUI") 154 on console 102. The GUI 154 also allows the user to request performance data and otherwise interface with the system agent 152 and the agents 154. Thus, the system in accordance with the present invention includes at least the agents 150, the system agent 152 and the GUI 154.

Figure 3:
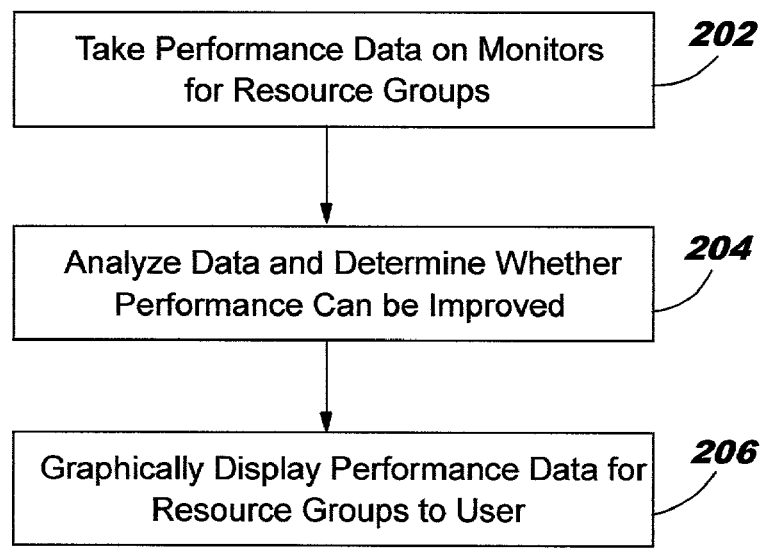
FIG. 3 is a high-level flow chart of one embodiment of a method in accordance with the present invention for providing performance analysis on resource groups.

FIG. 3 is a high-level flow chart of one embodiment of a method 200 in accordance with the present invention. The method 200 is described in conjunction with the system 100 depicted in FIG 2. Referring to FIGS. 2 and 3, the method 200 is preferably performed by a combination of the agents 150, the system agent 152 and the GUI 154. The method 200 is described in the context of providing performance analysis only for the resource groups 132, 134, 136, 138, 140, 142 and 144 in the clusters 110 and 130. However, the method 200 might be extended to use with the computer systems (not shown) containing only a single 20 node or one or more nodes containing a single resource group. In addition, the method 200 could be applied to a single cluster. The method 200 preferably commences after the resource groups 130; 132, 134, 136, 138, 140, 142 and 144 have been defined.

Performance data for a plurality of monitors is obtained from each of the resource groups 130, 132, 134 in the nodes 112 and 114 in cluster 110 and each of the resource groups 136, 138, 140, 142 and 144 in nodes 132, 134 and 136 of the cluster 130, via step 202. The monitors relate to the performance of the resource groups 130, 132, 134, 136, 138, 140, 142 and 144. In a preferred embodiment, the monitors include the disk utilization, CPU utilization, memory usage and network utilization of the public network and the interconnect for each of the resource groups 130, 132, 134, 136, 138, 140, 142 and 144. In addition, other monitors might be specified by the user. The performance data may be sampled frequently, for example every minute or several times per hour. In a preferred embodiment, the user can indicate the frequency of sampling for each monitor and the times for which each monitor is sampled. The user might also indicate the minimum or maximum data points to be sampled. Step 202 gathers performance data for monitors that relate to resource groups 130, 132, 134, 136, 138, 140, 142 and 144 regardless of whether the resource group 130, 132, 134, 136, 138, 140, 142 and 144 changes nodes. For example, if the resource group 130 moves from the node 112 to the node 114, performance data is gathered for the monitors while the resource group 130 is on the node 112 and while the resource group 130 is on the node 114.

The monitors used in step 202 are preferably the CPU utilization, the disk utilization, the memory utilization, the public network utilization, and the interconnect utilization for each of the resource groups 130, 132, 134, 136, 138, 140, 142 and 144. In addition, the CPU utilization, the disk utilization, the memory utilization, the public network utilization, and the interconnect utilization for each of the nodes 112, 114, 132, 134 and 136 can be determined in step 202. The CPU utilization, disk utilization and memory utilization for a particular node 110 or 130 is the sum of the CPU utilization, disk utilization and memory utilization, respectively, for each resource group 130, 132, 134, 136, 138, 140, 142 and 144, respectively, on the node 110 or 130, respectively, plus any additional load due to utilization by applications not in resource groups 130, 132, 134, 136, 138, 140, 142 and 144, respectively. Also, in a preferred embodiment, the first monitor for a particular component, such as the disk utilization, is the monitor for the node 110 or 130. Subsequent monitors are for the resource groups 130, 132, 134, 136, 138, 140, 142 and 144.

In general, CPU utilization is already monitored on a per-process basis. Thus, to collect performance data for the CPU utilization monitor for a resource group 130, 132, 134, 136, 138, 140, 142 and 144, the processes already monitored for the CPU are mapped to the appropriate resource group 130, 132, 134, 136, 138, 140, 142 and 144 and summed. The same is true for memory utilization. Currently, most interconnects and LANs do not check their workload on a per-process basis. Thus, in order to determine the interconnect utilization for a particular resource group, the control of the interconnects 113 and 133 must be altered at a lower level to track the use of the interconnects 113 and 133 at the process level. Similarly, the LAN 120 would be altered at a lower level to track usage of the LAN 120. The processes for the interconnects 113 and 133 as well as the LAN 120 can then be mapped to the appropriate resource groups 130, 132, 134, 136, 138, 140, 142 and 144. Thus, performance data for the interconnect utilization for each of the resource groups 130, 132, 134, 136, 138, 140, 142 and 144 can be obtained. Note that currently disk utilization is already per resource group since an entire disk must be assigned to a resource group; it is not currently possible for a resource group to use part of a disk. Thus, in a preferred embodiment, resource groups share CPU's, memory, and LAN and interconnects, but not disks.

The performance data obtained in step 202 is then analyzed, via step 204. Using this analysis, it can be determined whether performance of the clusters 110 and 130 can be improved using the resource groups 130, 132, 134, 136, 138, 140, 142 and 144. In a preferred embodiment, performance of clusters 110 and 130 may be improved by moving one or more of the resource groups 130, 132 and 134 and resource groups 136, 138, 140, 142 and 144 between nodes 112, 114 and nodes 132, 134 and 136 respectively. For example, step 204 may include averaging the performance data for the monitors, determining the minimum and maximum values for the monitors, or performing other operations on the performance data. Step 204 may also include determining whether one or more of the monitors have a bottleneck or a latent bottleneck in one or more of the resource groups 130, 132, 134, 136, 138, 140, 142 and 144. Based on the performance data, the method 200 can forecast future bottlenecks. A bottleneck for a monitor can be defined to occur when the monitor rises above a particular threshold. A latent bottleneck can be defined to occur when the monitor would become bottlenecked if another bottleneck is cleared. For each bottleneck, information relating to the bottleneck, such as the monitor which is bottlenecked, the frequency of the bottleneck for the particular node, the timestamp of when the bottleneck last commenced and a timestamp for when the bottleneck last ended are also preferably provided in step 204. In addition, step 204 may determine whether an action should be taken to resolve an existing bottleneck, such as moving one or more of the resource groups 130, 132, 134, 136, 138, 140, 142, 144 or 146 between nodes 112, 114, 132, 134 and 136. Thus, the performance data gathered in step 202 is analyzed in step 204.

The performance data for the resource group are graphically displayed to a user, via step 206. The performance data can be displayed in a graph in step 206. Preferably, the performance data can be displayed in at least two ways. The performance data for a particular monitor for a resource group 130, 132, 134, 136, 138, 140, 142 and 144 or resource groups 130, 132, 134, 136, 138, 140, 142 and 144 can be displayed for a particular node 112 or 114 or 132, 134 or 136. The performance data for a particular resource group or groups 130, 132, 134, 136, 138, 140, 142 and 144 can also be displayed across nodes 112 and 114 or 132, 134 or 136 in step 206.

Thus, performance data for different resource groups can be obtained using the method 200. In addition, a user can view the resource groups on a particular node or view resource group(s) irrespective of the node on which the resource group resides. As a result, a user can easily determine trends, bottlenecks, and other phenomenon relating to the performance of the nodes 112, 114, 132, 134 and 136.

FIG. 4 depicts a more detailed flow chart of one embodiment of a method 250 in accordance with the present invention for providing and displaying performance data for resource groups. The method 250 is described in conjunction with the system 100 depicted in FIG. 2. Referring to FIGS. 2 and 4, the method 250 is preferably performed by a combination of the agents 150, the system agent 152 and the GUI 154. The method 250 is described in the context of providing performance analysis only for the resource groups in the clusters 110 and 130. However, the method 250 might be extended to use with the computer systems 120 and 140 containing only a single node or to a single resource group. In addition, the method 250 can be applied to a single cluster.

A user is allowed to define the resource groups 130, 132, 134, 136, 138, 140, 142 and 144 for which performance data will be obtained, via step 252. The user can account for dependencies of resource types in the resource groups in step 252. Performance data is gathered for the resource groups 130, 132, 134, 136, 138, 140, 142 and 144, via step 254. The performance data taken in step 254 is performance data for the monitors discussed above. In a preferred embodiment, step 254 obtains the performance data from the nodes 112, 114, 132, 134 and 136. Also in a preferred embodiment, the performance data is obtained by monitoring individual processes in the CPU (not shown), the disk (not shown), the memory (not shown) and the interconnects 113 and 133 and the LAN 120. The processes are also preferably mapped to the appropriate resource groups, via step 256. Thus, through steps 254 and 256, the performance data for the resource groups can be obtained.

The performance data is analyzed, via step 258. Thus, averages, minima and maxima, whether a particular monitor or monitors exceeds a threshold and is thus bottlenecked can be determined in step 258.

It is determined whether the user desires to view the performance data from the node perspective, via step 260. In one embodiment, step 260 allows the monitors for the resource groups 130, 132, 134, 136, 138, 140, 142 and 144 to be displayed or hidden. In addition, step 260 also causes the nodes 112, 114, 132, 134 and 136 within clusters to be displayed, hiding nodes (not shown) which are not part of a cluster. Thus, the step 260 might be broken into two substeps. If the user desires to view the data in this manner, then performance data for one or more monitors of one or more of the resource groups on a particular node are displayed, via step 262. Step 262 can also include displaying the utilization of other applications not in resource groups. Displaying the total utilizations of a particular monitor for a node allows a user to determine whether a particular node has a bottleneck because of multiple resource groups.

Once the performance data for a node is displayed in step 262 or it is determined in step 260 that the user does not desire to view the performance data from the node perspective, then it is determined whether the user desires to view the performance data from the resource group perspective, via step 264. If the user desires to view the performance data from the resource group perspective, then the data is displayed by resource group, via step 266. In a preferred embodiment, step 266 includes graphing data for a monitor or monitors on a single graph irrespective of transfers between nodes. This allows a user to determine the resources a particular resource group 130, 132, 134, 136, 138, 140, 142 and 144 uses regardless of the node 112, 114, 132, 134 or 136 on which the resource group resides.

Thus, using the method 250, performance data for different resource groups can be obtained. In addition, a user can view the resource groups on a particular node or view resource group(s) irrespective of the node on which the resource group resides. As a result, a user can easily determine trends, bottlenecks, and other phenomenon relating to the performance of the nodes 112, 114, 132, 134 and 136.

Figure 5A:
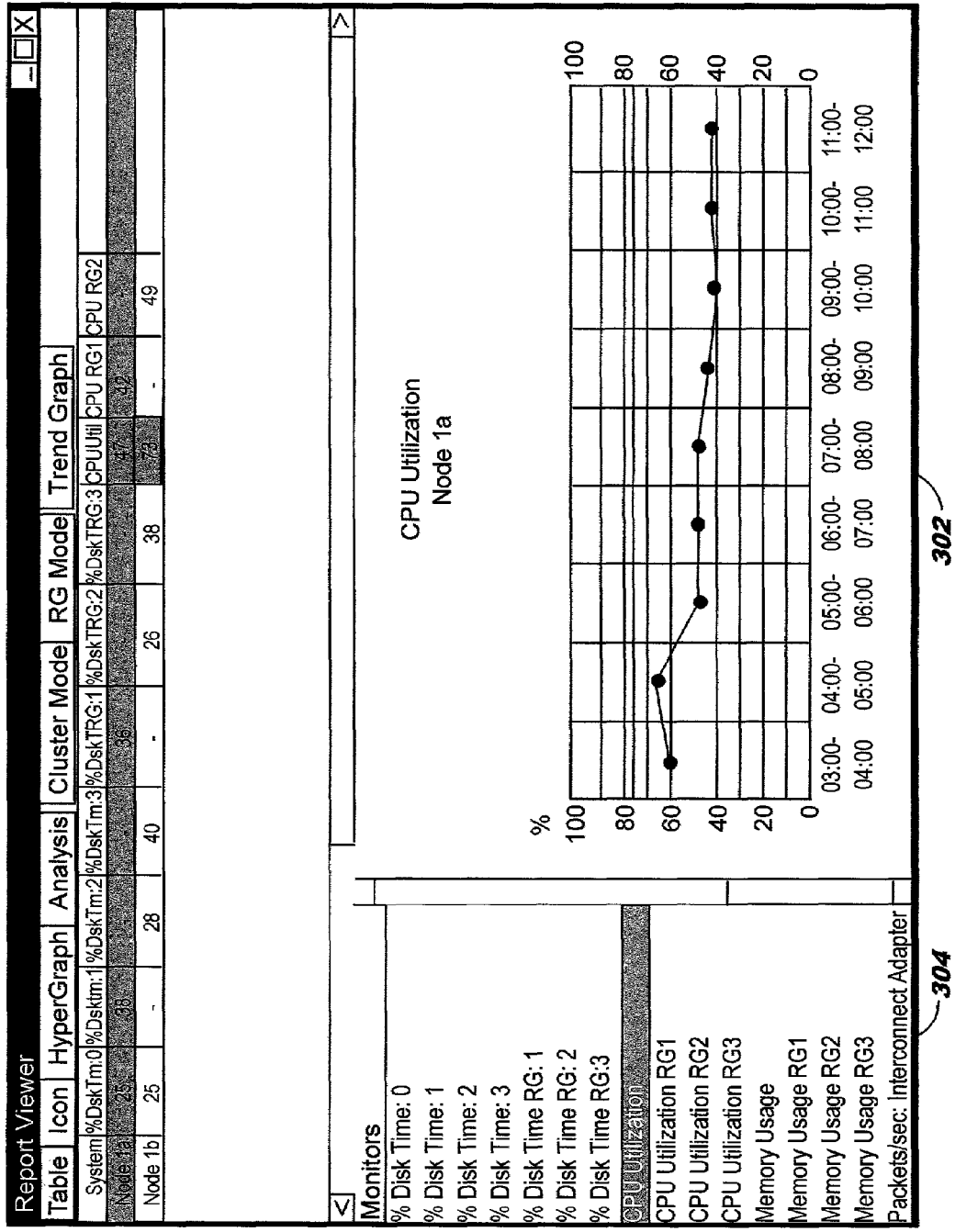
FIG. 5A depicts one embodiment in accordance with the present invention of a graphical user interface for displaying performance data for a node.

FIGS. 5A–5D depicts embodiments of the graphical user interface that provides the performance data to the user for viewing. FIG. 5A is graphical user interface ("GUI") 300 depicting the data for a CPU utilization monitor on a particular node 112, called node 1a. The GUI 300 includes the monitors 304 that can be selected from and a graph 302 depicting the CPU utilization monitor for the node 112. Thus, the user can determine whether the use of the CPU for the entire node 112 is within desired boundaries. In addition, note that in FIG. 5A the monitors 304 include both monitors for the nodes as well as monitors for particular resource groups (the monitors having RG in their name). For example, the monitor "CPU Utilization" is for the entire node, while CPU Utilization RG1, CPU Utilization RG2 and CPU Utilization RG3 are for resource groups on the node. In addition, in one embodiment, the monitors for the resource groups may be hidden or displayed based on the user's choice.

Figure 5B:
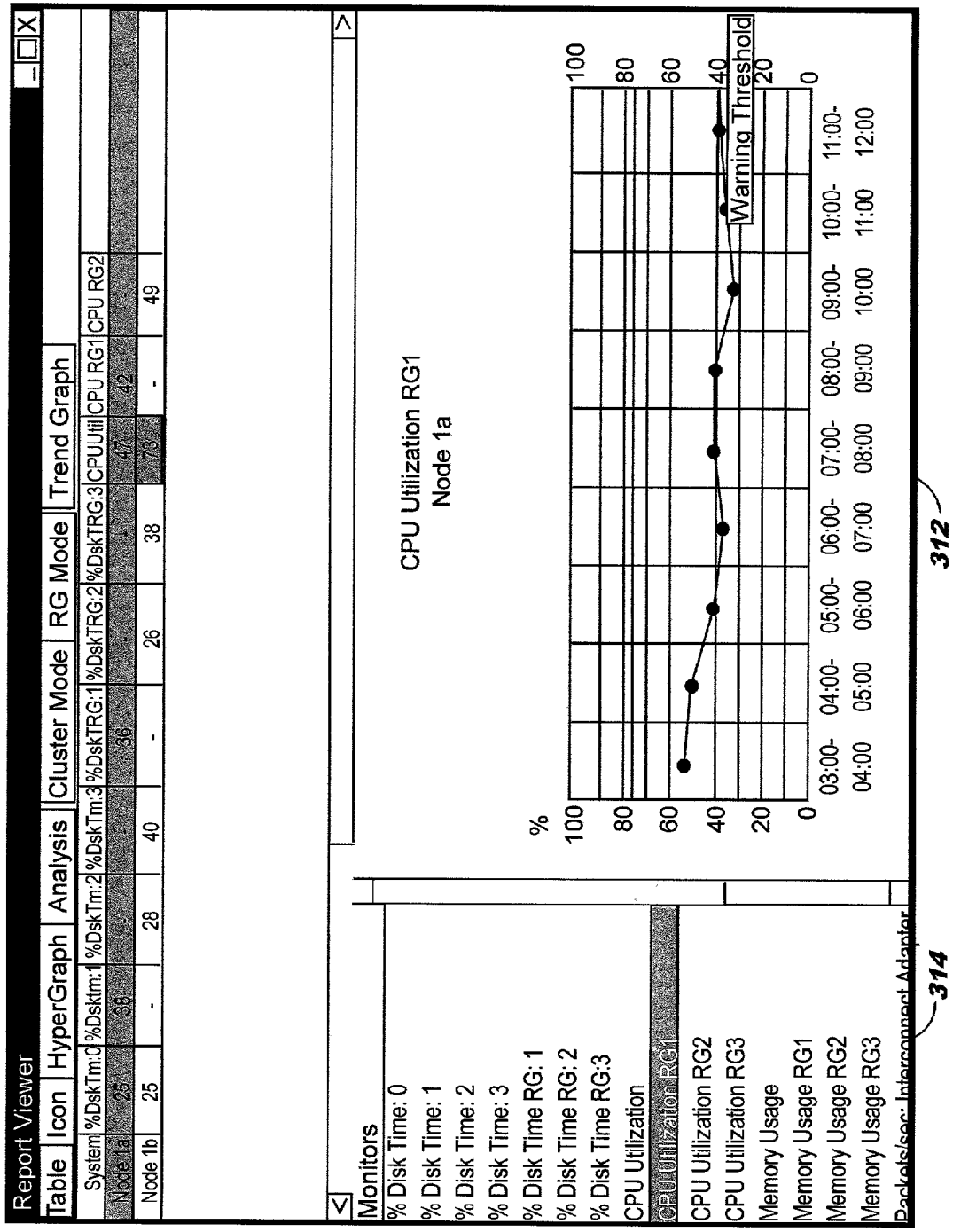
FIG. 5B depicts an embodiment in accordance with the present invention of a graphical user interface for displaying performance data for a resource group on a node.

FIG. 5B is a GUI 310 depicting the data for a CPU utilization monitor on a resource group 130, called resource group 1, on the particular node 112, called node 1a. The GUI 310 includes the monitors 314 that can be selected from and a graph 312 depicting the CPU utilization monitor for the resource group 130. By selecting different ones of the monitors 314 performance data for different monitors will be plotted on the graph 312. Thus, the user can determine how the resource group 130 utilizes the CPU of the node 112. Hence, one can evaluate the impact of moving are source group 130, 132 or 134 and 136, 138, 140, 142 and 144 between nodes 112 and 114 and nodes 132, 134 and 136, respectively to determine whether existing bottlenecks would be alleviated without creating new bottlenecks. More importantly, an algorithm can consider all possible reassignments of resource groups 130, 132, 134, 136, 138, 140, 142 and 144 to see if any of them eliminate all bottlenecks. The algorithm could be triggered by the existence of bottlenecks, and suggest the minimal number of resource group 130, 132, 134, 136, 138, 140, 142 and 144 moves between nodes that would alleviate the bottleneck. Note that the algorithm must add up all the resource group 130, 132, 134, 136, 138, 140, 142 and 144 monitors for each of the summation monitors; for instance, it must consider all the "CPU Utilization RGn" monitors and add them up to CPU Utilization for each node; then it must consider all the interconnect monitors in the same way, and then the public LAN monitors, and then the memory monitors. Each summation must be done for every time point. This entire set of calculations must be performed for each possible scenario of resource group reassignments to find the one that is optimal.

Figure 5C:
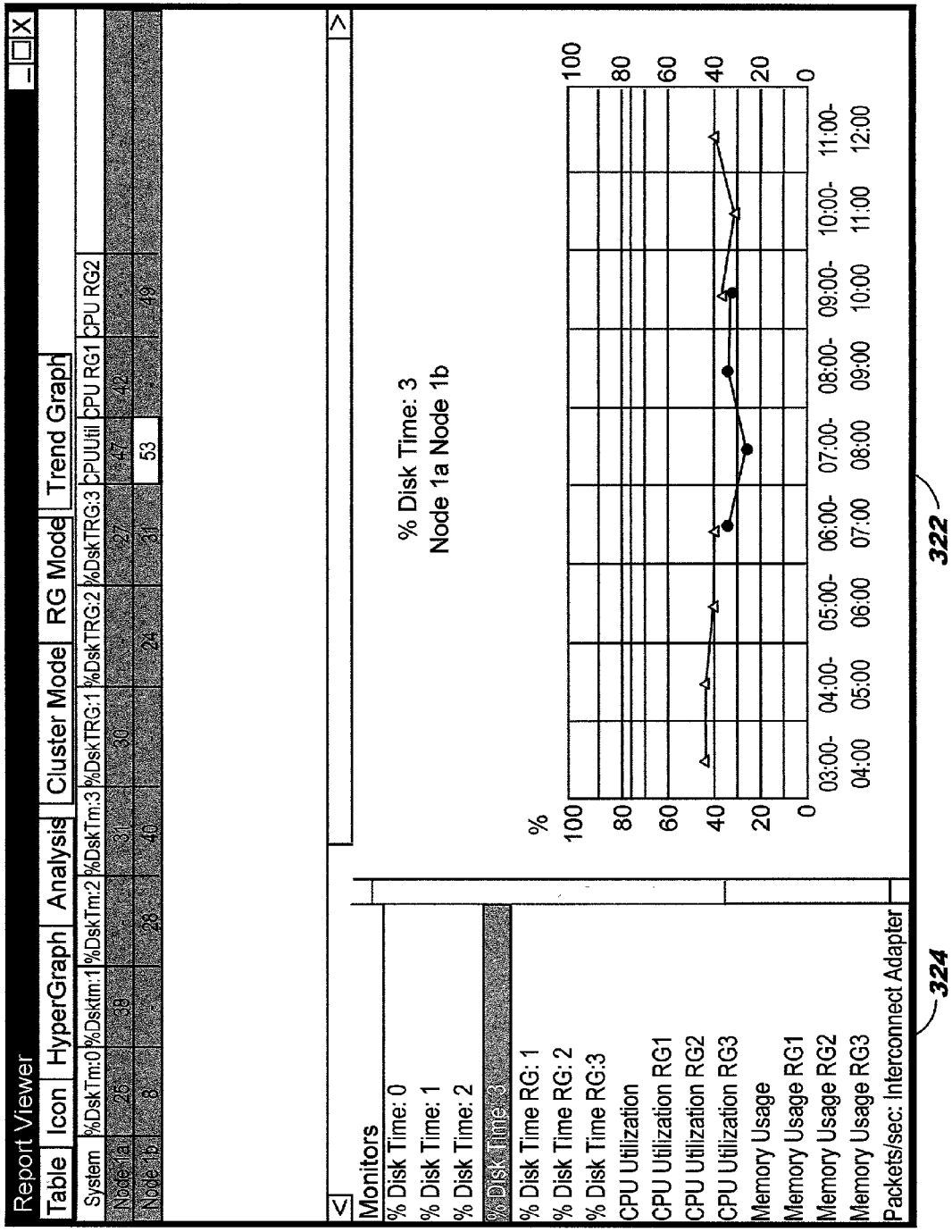
FIG. 5C depicts one embodiment in accordance with the present invention of a graphical user interface for displaying performance data for a resource group regardless of the node on which the resource group resides.

FIG. 5C is a GUI 320 depicting the data for a disk utilization monitor on a resource group 130, called resource group 1, as it moves across node 112, called node 1a and node 114, called node 1b. The GUI 310 includes the monitors 324 that can be selected from and a graph 322 depicting the disk utilization monitor for the resource group 130. By selecting different ones of the monitors 324 performance data for different monitors will be plotted on the graph 332. The presence of the resource group 130 on multiple nodes 112 and 114 is shown on the graph 322 by the use of different symbols. The triangles correspond to node 112, while the squares correspond to node 114. Thus, as is apparent from the graph 322, the resource group 130 starts at node 112, moves to node 114, then returns to node 112. Thus, the user can determine how the resource group 130 utilizes resources on each node 112 and 114 as well as when the resource group 130 moves between nodes 112 and 114.

Figure 5D:
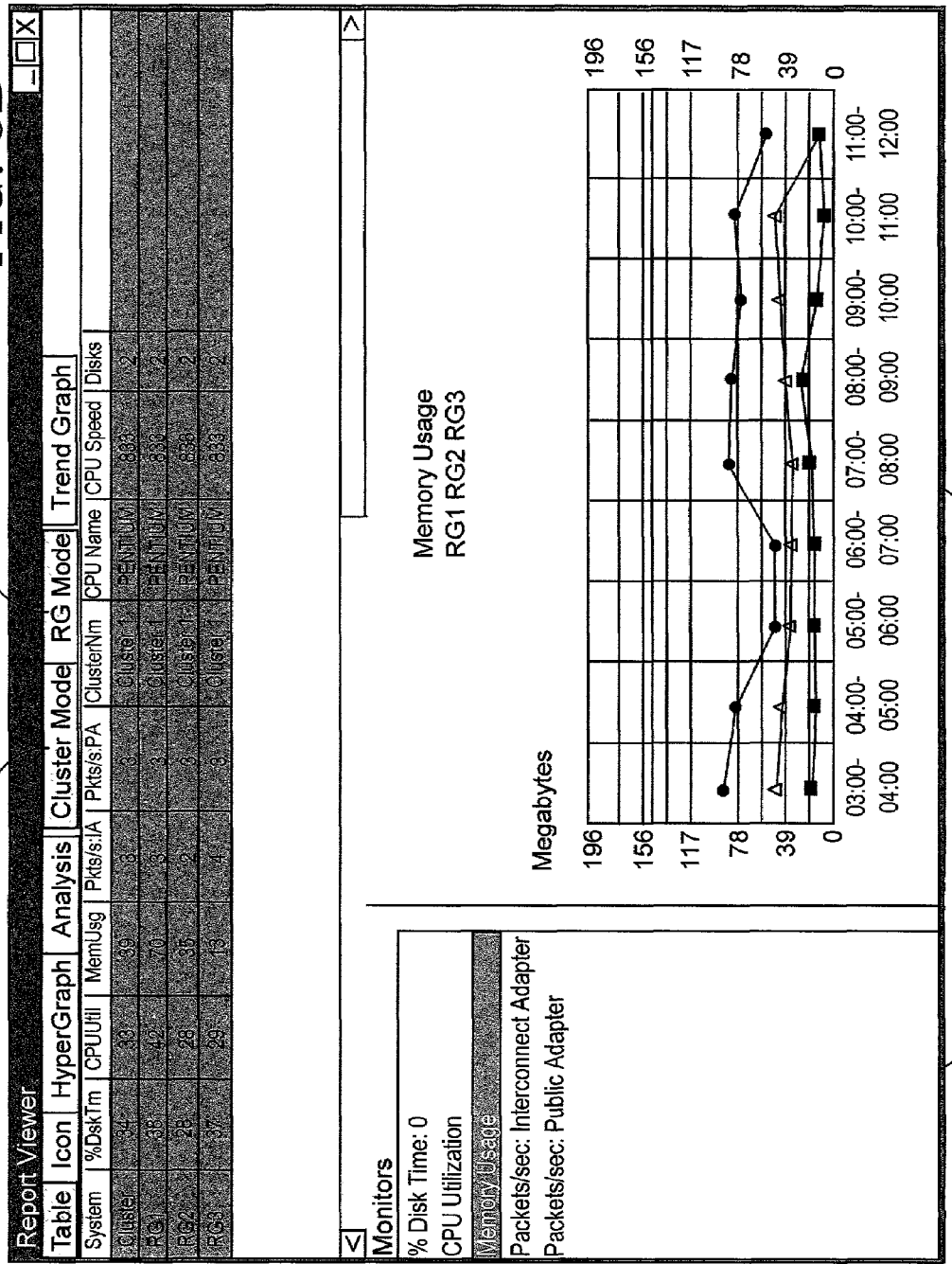
FIG. 5D depicts an embodiment in accordance with the present invention of a graphical user interface for displaying performance data for resource groups across multiple nodes.

FIG. 5D is a GUI 330 depicting the data for a memory utilization monitor on resource groups 130, 132 and 134, called resource groups 1, 2 and 3, respectively. The GUI 330 includes the monitors 334 that can be selected from and a graph 332 depicting the memory utilization monitor for the resources group 130, 132 and 134. In addition, note that the cluster mode button 336 and the resource group mode button 338 are depressed. The resource group mode button 338 may have been depressed in step 260 of the method 250 depicted in FIG. 4. Referring to FIGS. 5D and FIG. 4, the cluster mode button 336 may have been depressed in step 264 of the method 250. By selecting different ones of the monitors 334 performance data for different monitors will be plotted on the graph 332. Thus, using the graph 332, the user can compare the memory utilization for the resource groups 130, 132 and 134 residing on all nodes at once. The monitors for the resource groups are depicted without regard to which node they are on. This enables forecasting on the resource group level. A user can forecast where a resource group monitor is going in the future, which was not possible when the data for a resource group was spread across nodes.

Thus, a user is allowed to graphically view performance data for resource groups in a variety of ways. As a result, a user can easily determine trends, bottlenecks, and other phenomenon relating to the performance of the nodes 112, 114, 132, 134 and 136. Using the information provided, the user can determine how to improve the performance of the cluster 110 or 130 through the resource groups, for example by moving the resource group to a different node.

A method and system has been disclosed for analyzing and displaying performance data for resource groups. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing performance analysis on a computer system including at least one resource group and at least one node, the method comprising the steps of:
    obtaining performance data for a plurality of monitors for the at least one resource group,
    analyzing the performance data to determine whether performance of the system can be improved using the at least one resource group;
    forecasting a bottleneck for the monitor of the plurality monitors, the bottleneck including a latent bottleneck; and
    graphically displaying performance data for at least one monitor of the plurality of monitors for the at least one resource group.

2. The method of claim 1 wherein the at least one node include a plurality of nodes, wherein the at least one resource group moves between the plurality of nodes and wherein the graphically displaying step further includes the step of:
    displaying the performance data for the at least one monitor on the plurality of nodes in a single graph.

3. The method of claim 1 wherein the plurality of monitors further include disk utilization for the at least one resource group.

4. The method of claim 1 wherein the plurality of monitors further include CPU utilization for the at least one resource group.

5. The method of claim 1 wherein the plurality of monitors further include memory utilization for the at least one resource group.

6. The method of claim 1 wherein the plurality of monitors further include network utilization for the at least one resource group.

7. The method of claim 6 wherein the network utilization further includes public LAN utilization.

8. The method of claim 7 wherein the interconnect utilization further includes interconnect utilization.

9. The method of claim 1 further comprising the step of:
    allowing a user to define the at least one resource group.

10. The method of claim 1 wherein the at least one node include a plurality of nodes and wherein the analyzing step further includes the step of:
    determining whether performance of the system can be improved by moving the at least one resource group between the plurality of nodes.

11. The method of claim 10 wherein the analyzing step (b) further includes the step of:
    determining an optimal assignment to a node of the plurality of nodes for the at least one resource group.

12. A computer-readable medium containing a program for providing performance analysis on a computer system including at least one resource group and at least one node, the program including instructions for:
    obtaining performance data for a plurality of monitors for the at least one resource group,
    analyzing the performance data to determine whether performance of the system can be improved using the at least one resource group;
    forecasting a bottleneck for the monitor of the plurality monitors, the bottleneck including a latent bottleneck; and
    graphically displaying performance data for at least one monitor of the plurality of monitors for the at least one resource group.

13. A system programmed to provide performance analysis on a computer system including at least one resource group and at least one node, the system comprising:
    means for obtaining performance data for at least one resource group, the performance data relating to a plurality of monitors for the at least one resource group and for analyzing the performance data to determine whether performance of the computer system can be improved using the at least one resource group;
    means for forecasting a bottleneck for the monitor of the plurality monitors, the bottleneck including a latent bottleneck; and
    a graphical user interface for displaying performance data for at least one monitor of the plurality of monitors for the at least one resource group.

14. The system of claim 13 wherein the obtaining and analyzing means further include a plurality of agents residing in the plurality of computer systems.

* * * * *

UNITED STATES PATENT AND TRADEMARK OFFICE
CERTIFICATE OF CORRECTION

| | | |
|---|---|---|
| PATENT NO. | : 7,016,972 B2 | Page 1 of 1 |
| APPLICATION NO. | : 09/840400 | |
| DATED | : March 21, 2006 | |
| INVENTOR(S) | : Bertram et al. | |

It is certified that error appears in the above-identified patent and that said Letters Patent is hereby corrected as shown below:

In column 6, line 65, delete "20".

In column 10, line 22, delete "are source" and replace with --a resource--.

Signed and Sealed this

Twenty-second Day of August, 2006

JON W. DUDAS
*Director of the United States Patent and Trademark Office*